(12) United States Patent
Ichinose et al.

(10) Patent No.: US 12,441,283 B2
(45) Date of Patent: Oct. 14, 2025

(54) DUMP TRUCK

(71) Applicant: Hitachi Construction Machinery Co., Ltd., Tokyo (JP)

(72) Inventors: Masanori Ichinose, Tokyo (JP); Atsushi Kitaguchi, Tsuchiura (JP); Kazunori Ishihara, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 27 days.

(21) Appl. No.: 18/279,111

(22) PCT Filed: Mar. 23, 2022

(86) PCT No.: PCT/JP2022/013331
§ 371 (c)(1),
(2) Date: Aug. 28, 2023

(87) PCT Pub. No.: WO2022/254891
PCT Pub. Date: Dec. 8, 2022

(65) Prior Publication Data
US 2024/0140378 A1 May 2, 2024

(30) Foreign Application Priority Data

Jun. 2, 2021 (JP) .................................. 2021-093163

(51) Int. Cl.
*B60T 8/17* (2006.01)
*B60L 7/14* (2006.01)
(Continued)

(52) U.S. Cl.
CPC ............ *B60T 8/17616* (2013.01); *B60L 7/14* (2013.01); *B60P 1/04* (2013.01); *B60T 2250/04* (2013.01); *B60T 2270/603* (2013.01)

(58) Field of Classification Search
CPC ............ B60T 8/17616; B60T 2250/04; B60T 2270/603; B60T 2270/602;
(Continued)

(56) References Cited

FOREIGN PATENT DOCUMENTS

| JP | 60-50061 A | 3/1985 |
|---|---|---|
| JP | 8-98313 A | 4/1996 |

(Continued)

OTHER PUBLICATIONS

International Preliminary Report on Patentability (PCT/IB/338 & PCT/IB/373) issued in PCT Application No. PCT/JP2022/013331 dated Dec. 14, 2023, including English translation of Written Opinion (PCT/ISA/237) (7 pages).
(Continued)

*Primary Examiner* — Hai H Huynh
(74) *Attorney, Agent, or Firm* — Crowell & Moring LLP

(57) ABSTRACT

A dump truck reduces drive wheel braking torques to avoid locking drive wheels during slipping and generates braking torques for driven wheels to ensure an overall braking torque using a controller that outputs a regenerative torque command value, corresponding to a brake pedal operation amount, to an inverter that regeneratively controls electric motors. The controller reduces the regenerative torque command value and outputs a drive command value, corresponding to a regenerative torque command value reduction amount, to a solenoid proportional valve, when the controller determines that slip ratios of rear wheels equal or exceed a predetermined value. A hydraulic pressure generated by a hydraulic valve based on the brake pedal operation amount actuates rear wheel brakes. A hydraulic pressure selected by a higher-pressure selecting valve that selects the higher of the hydraulic pressure from the hydraulic valve and the hydraulic pressure from the solenoid proportional valve actuates front wheel brakes.

12 Claims, 7 Drawing Sheets

(51) Int. Cl.
*B60P 1/04* (2006.01)
*B60T 8/1761* (2006.01)

(58) Field of Classification Search
CPC ......... B60T 2270/604; B60T 2270/608; B60T 1/10; B60L 7/14; B60L 7/26; B60L 15/2009; B60L 2200/36; B60L 2240/12; B60L 2240/26; B60L 2240/461; B60L 2240/465; B60L 3/102; B60L 3/108; B60P 1/04; B60W 30/18127; B60W 2300/17; Y02T 10/72
USPC ..................................................... 701/70, 71
See application file for complete search history.

(56) References Cited

FOREIGN PATENT DOCUMENTS

| | | |
|---|---|---|
| JP | 11-245801 A | 9/1999 |
| JP | 2011-56969 A | 3/2011 |
| JP | 2020-149325 A | 9/2020 |

OTHER PUBLICATIONS

International Search Report (PCT/ISA/210) issued in PCT Application No. PCT/JP2022/013331 dated Jun. 14, 2022 with English translation (4 pages).
Japanese-language Written Opinion (PCT/ISA/237) issued in PCT Application No. PCT/JP2022/013331 dated Jun. 14, 2022 with English translation (9 pages).

DUMP TRUCK

TECHNICAL FIELD

The present invention relates to a dump truck having two brake pedals.

BACKGROUND ART

A dump truck disclosed in Patent Document 1 includes a plurality of rear wheels (drive wheels) driven by an electric motor, a plurality of front wheels (driven wheels), a retard brake pedal operable by the driver, a controller for regeneratively controlling the electric motor in response to an operation of the retard brake pedal to generate a braking torque for the rear wheels, a service brake pedal operable by the driver, a rear wheel brake (drive wheel brake) operable in response to an operation of the service brake pedal for generating a braking torque for the rear wheels, and a front brake (driven wheel brake) operable in response to the operation of the service brake pedal for generating a braking torque for the front wheels.

PRIOR ART DOCUMENT

Patent Document

Patent Document 1: JP-2020-149325-A

SUMMARY OF THE INVENTION

Problems to be Solved by the Invention

Dump trucks drive around mines, for example, to transport ore and gravel that have been excavated. The loaded state of the cargo bed of dump trucks and the state of mine roads traveled by them vary from time to time, and so does the ratio of loads borne by the front and rear wheels of the dump trucks. Specifically, when a dump truck travels downhill on a mine road, the dump truck tends to lean forward, increasing the load on the front wheels and reducing the load on the rear wheels. When the cargo bed of a dump truck is empty, the load on the rear wheels is small, making the rear wheels easy to slip on the road. When the road is then in a bad condition due to the weather, the rear wheels are much easier to slip.

The front and rear wheel brakes referred above are hydraulic brakes, for example. When those brakes are used more frequently, their shoes (frictional members) are deteriorated sooner. Therefore, it is customary for the driver to operate a retard brake pedal for normal braking and to operate a service brake pedal for emergency braking. However, when the rear wheels slip in normal braking (i.e., when the driver operates the retard brake pedal and does not operate the service brake pedal), an action taken by the driver to either augment an operation amount of the retard brake pedal or additionally operate the service brake pedal is liable to aggravate the slippage of the rear wheels.

The present invention has been made in view of the above problems. It is an object of the present invention to provide a dump truck that is capable of reducing braking torques generated for drive wheels by an electric motor to avoid locking of the drive wheels when the drive wheels slip, and of generating braking torques for driven wheels by driven wheel brakes to ensure an overall braking torque for the vehicle.

Means for Solving the Problems

In order to accomplish the above object, there is provided in accordance with the present invention a dump truck including a plurality of drive wheels, a plurality of driven wheels, an electric motor for driving the plurality of drive wheels, an inverter for controlling the electric motor, a first brake pedal operable by a driver, a controller configured to output a regenerative torque command value for generating a braking torque corresponding to an operation amount of the first brake pedal to the inverter and to cause the inverter to regeneratively control the electric motor, a second brake pedal operable by the driver, a hydraulic valve for generating a hydraulic pressure corresponding to an operation amount of the second brake pedal, a plurality of drive wheel brakes combined with the plurality of respective drive wheels and actuated according to the hydraulic pressure generated by the hydraulic valve, and a plurality of driven wheel brakes combined with the plurality of respective driven wheels and actuated according to the hydraulic pressure generated by the hydraulic valve. The dump truck further includes a plurality of drive wheel peripheral velocity sensors that sense respective peripheral velocities of the plurality of drive wheels, a solenoid proportional valve for generating a hydraulic pressure, and a higher-pressure selecting valve for selecting and delivering a higher one of the hydraulic pressure from the hydraulic valve and the hydraulic pressure from the solenoid proportional valve. The controller is configured to determine whether or not slip ratios of the plurality of drive wheels are equal to or larger than a predetermined value on a basis of sensed results from the plurality of drive wheel peripheral velocity sensors, when the first brake pedal is operated and the second brake pedal is not operated, the controller is configured to reduce the regenerative torque command value and output a drive command value for generating a braking torque corresponding to the reduction amount of the regenerative torque command value to the solenoid proportional valve, when the controller is configured to determine that the slip ratio of at least one of the drive wheels is equal to or larger than the predetermined value, the solenoid proportional valve generates a hydraulic pressure corresponding to the drive command value, and the plurality of driven wheel brakes are actuated according to the hydraulic pressure selected by the higher-pressure selecting valve.

Advantages of the Invention

According to the present invention, when drive wheels slip, braking torques generated for drive wheels by an electric motor are reduced to avoid locking of the drive wheels, and braking torques are generated for driven wheels by driven wheel brakes to ensure an overall braking torque for the vehicle.

MODES FOR CARRYING OUT THE INVENTION

First Embodiment

A first embodiment of the present invention will be described below with reference to the drawings.

Figure 1:
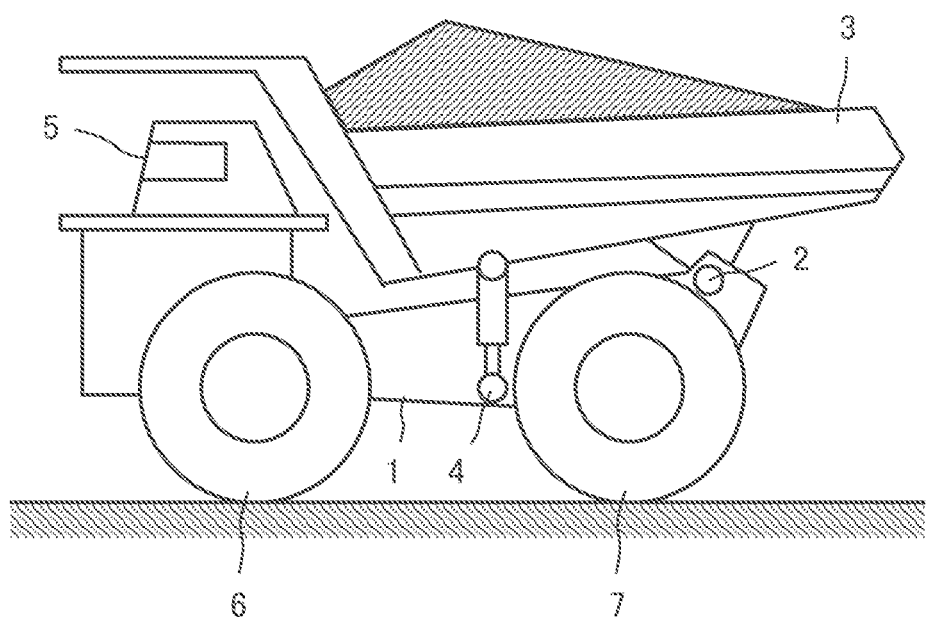
FIG. 1 is a side elevational view illustrating a structure of a dump truck according to a first embodiment of the present invention.

FIG. 1 is a side elevational view illustrating a structure of a dump truck according to the present embodiment.

The dump truck according to the present embodiment drives around a mine, for example, to transport ore and gravel that have been excavated. The dump truck includes a vehicle frame 1, a cargo bed 3 pivotably supported on a rear portion of the vehicle frame 1 by a support shaft 2, a hoist cylinder 4 for pivotably moving the cargo bed 3, a cabin 5 mounted on a front portion of the vehicle frame 1, a plurality of rear wheels 6 mounted on a rear side of the vehicle frame 1, and a plurality of front wheels 7 mounted on a front side of the vehicle frame 1. Note that, according to the present embodiment, the rear wheels 6 act as drive wheels and the front wheels 7 as driven wheels.

As illustrated, the cargo bed 3 carries a load such as ore and gravel. The cargo bed 3 is pivotably moved about the support shaft 2 (specifically, the cargo 3 is tilted such that its front end is lifted), discharging the load.

The cabin 5 houses therein a driver's seat (not shown) where the driver is seated, an accelerator pedal (not shown) operable by the driver, a retard brake pedal 8 (see FIG. 2 to be described later), and a service brake pedal 9 (see FIG. 2 to be described later).

The accelerator pedal is operated by the driver when the driver wants to start and accelerate the dump truck. The retard brake pedal 8 is operated by the driver when the driver wants to brake the dump truck normally. The service brake pedal 9 is operated by the driver when the driver wants to brake the dump truck in emergency.

Figure 2:
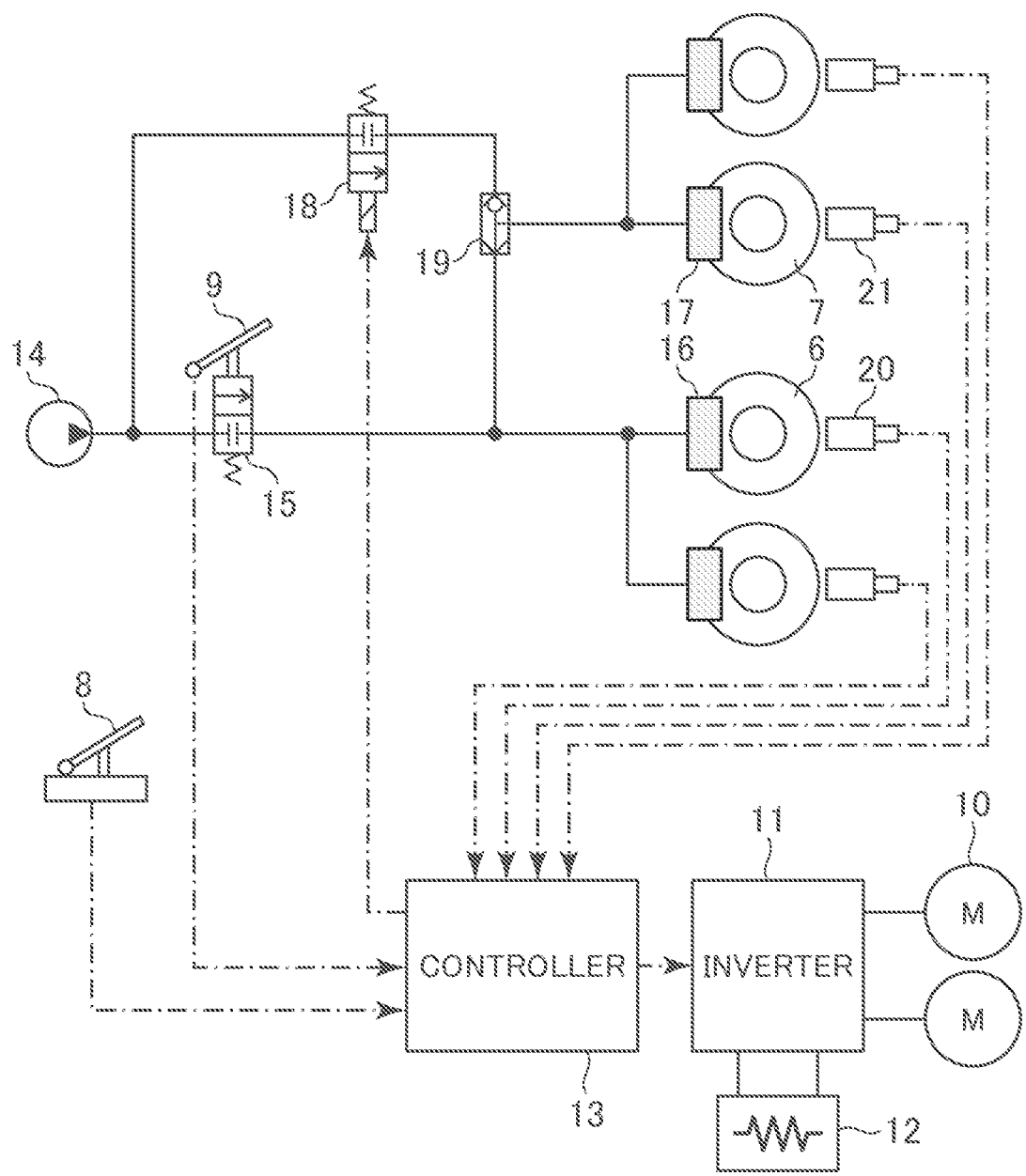
FIG. 2 is a diagram illustrating a configuration of a drive system of the dump truck according to the first embodiment of the present invention.

FIG. 2 is a diagram illustrating a configuration of a drive system of the dump truck according to the present embodiment.

The drive system of the dump truck according to the present embodiment includes, in addition to the accelerator pedal and the retard brake pedal (first brake pedal) 8 described above, left and right electric motors 10, an inverter 11, a resistor 12, and a controller 13. The left and right electric motors 10 drive left and right rear wheels 6, respectively. The controller 13 includes a CPU, a ROM, a RAM, and the like.

The accelerator pedal has a potentiometer (not shown) for sensing an operation amount thereof, and outputs the sensed operation amount to the controller 13. The retard brake pedal 8 has a potentiometer (not shown) for sensing an operation amount thereof, and outputs the sensed operation amount to the controller 13.

It is assumed that the driver has operated the accelerator pedal. In this case, the controller 13 outputs a drive torque command value corresponding (specifically, proportional, for example) to the operation amount of the accelerator pedal to the inverter 11, which energizes the electric motors 10. The inverter 11 controls electric power to be supplied to the electric motors 10 by use of electric power supplied from an electric generator (not shown) driven by an engine (not shown). In this manner, drive torques generated by the electric motors 10 for the rear wheels are controlled.

It is assumed that the driver has operated the retard brake pedal 8. In this case, the controller 13 outputs a regenerative torque command value for generating a braking torque corresponding (specifically, proportional, for example) to the operation amount of the retard brake pedal 8 to the inverter 11, which regeneratively controls the electric motors 10. The inverter 11 operates the electric motors 10 as electric generators and controls electric power generated by the electric motors 10. In this manner, braking torques generated for the rear wheels by the electric motors 10 are controlled. Note that the inverter 11 supplies the electric power generated by the electric motors 10 to the resistor 12, which consumes the supplied electric power.

The drive system of the dump truck according to the present embodiment includes, in addition to the service brake pedal (second brake pedal) 9 described above, a hydraulic pump 14, a hydraulic valve 15, a plurality of rear wheel brakes (drive wheel brakes) 16, and a plurality of front wheel brakes (driven wheel brakes) 17. Further, according to features of the present embodiment, the drive system includes a solenoid proportional valve 18, a higher-pressure selecting valve 19, a plurality of rear wheel peripheral velocity sensors (drive wheel peripheral velocity sensors) 20, and a plurality of front wheel peripheral velocity sensors (driven wheel peripheral velocity sensors) 21.

The hydraulic valve 15 is a mechanically operable valve, for example, and is operated when the service brake pedal 9 is operated. Owing to this, the hydraulic valve 15 generates a hydraulic pressure corresponding (specifically, proportional, for example) to the operation amount of the service brake pedal 9, with the hydraulic pressure discharged from the hydraulic pump 14 as a source pressure, and delivers the generated hydraulic pressure to the plurality of rear wheel brakes 16 and the high-pressure selecting valve 9. The plurality of rear brakes 16 are a plurality of hydraulic brakes combined respectively with the plurality of rear wheels 6, and are actuated by the hydraulic pressure from the hydraulic valve 15. Each of the hydraulic brakes includes, for example, a disk rotatable in unison with the wheel and a hydraulic cylinder for pressing a shoe (frictional member) against the disk, and generates a frictional torque (braking torque) depending on the pressing force from the shoe.

The solenoid proportional valve 18 is actuated by a drive command (electric signal) from the controller 13. Accordingly, the solenoid proportional valve 18 generates a hydraulic pressure corresponding to the drive command value (electric signal value) from the controller 13, with the hydraulic pressure discharged from the hydraulic pump 14 as a source pressure, and delivers the generated hydraulic pressure to the higher-pressure selecting valve 19. The higher-pressure selecting valve 19 selects a higher one of the hydraulic pressure from the hydraulic valve 15 and the hydraulic pressure from the solenoid proportional valve 18, and delivers the selected hydraulic pressure to the plurality of front wheel brakes 17. The plurality of front wheel brakes 17 are respective hydraulic brakes combined respectively with the plurality of front wheels 7, and are actuated by the hydraulic pressure selected by the higher-pressure selecting valve 19.

It is assumed that the driver does not operate the retard brake pedal 8 and operates the service brake pedal 9. In this case, the hydraulic pressure from the hydraulic valve 15 is delivered to the rear wheel brakes 16 and the front wheel brakes 17, actuating the rear wheel brakes 16 and the front wheel brakes 17. As a result, the rear wheel brakes 16 generate braking torques for the rear wheels, and the front wheel brakes 17 generate braking torques for the front wheels 7.

The service brake pedal 9 has a potentiometer (not shown) for sensing an operation amount thereof, and outputs the sensed operation amount to the controller 13. The plurality of rear wheel peripheral velocity sensors 20 sense respective peripheral velocities $v_r$ of the plurality of rear wheels 6 and output the sensed peripheral velocities $v_r$ to the controller 13. Each of the peripheral velocities $v_r$ of the rear wheels 6 is represented by (the radius $R_r$ of the rear wheel 6)×(the rotational angular velocity $\omega_r$ of the rear wheel 6). The plurality of front wheel peripheral velocity sensors 21 sense respective peripheral velocities $v_f$ of the plurality of front wheels 7 and output the sensed peripheral velocities $v_f$ to the controller 13. Each of the peripheral velocities $v_f$ of the front wheels 7 is represented by (the radius $R_f$ of the front wheel 7)×(the rotational angular velocity $\omega_f$ of the front wheel 7).

The controller 13 determines whether or not the retard brake pedal 8 has been operated and the service brake pedal 9 has not been operated on the basis of the operation amount of the retard brake pedal 8 and the operation amount of the service brake pedal that have been sensed by the respective potentiometers thereof. When the controller 13 determines that the retard brake pedal 8 has been operated and the service brake pedal 9 has not been operated, then the controller 13 determines whether the rear wheels 6 have slipped or not, on the basis of the sensed results from the rear wheel peripheral velocity sensors 20 or the like. When the controller 13 determines that the rear wheels 6 have slipped, the controller 13 reduces the regenerative torque command value for the inverter 11.

Further, the controller 13 outputs a drive command value for generating a braking torque corresponding to a reduction amount of the regenerative torque command value to the solenoid proportional valve 18. Here, since the retard brake pedal 8 has been operated and the service brake pedal 9 has not been operated, as described above, the hydraulic pressure generated by the solenoid proportional valve 18 is delivered through the higher-pressure selecting valve 19 to the front wheel brakes 17, so that the front wheel brakes 17 are actuated.

Figure 3:
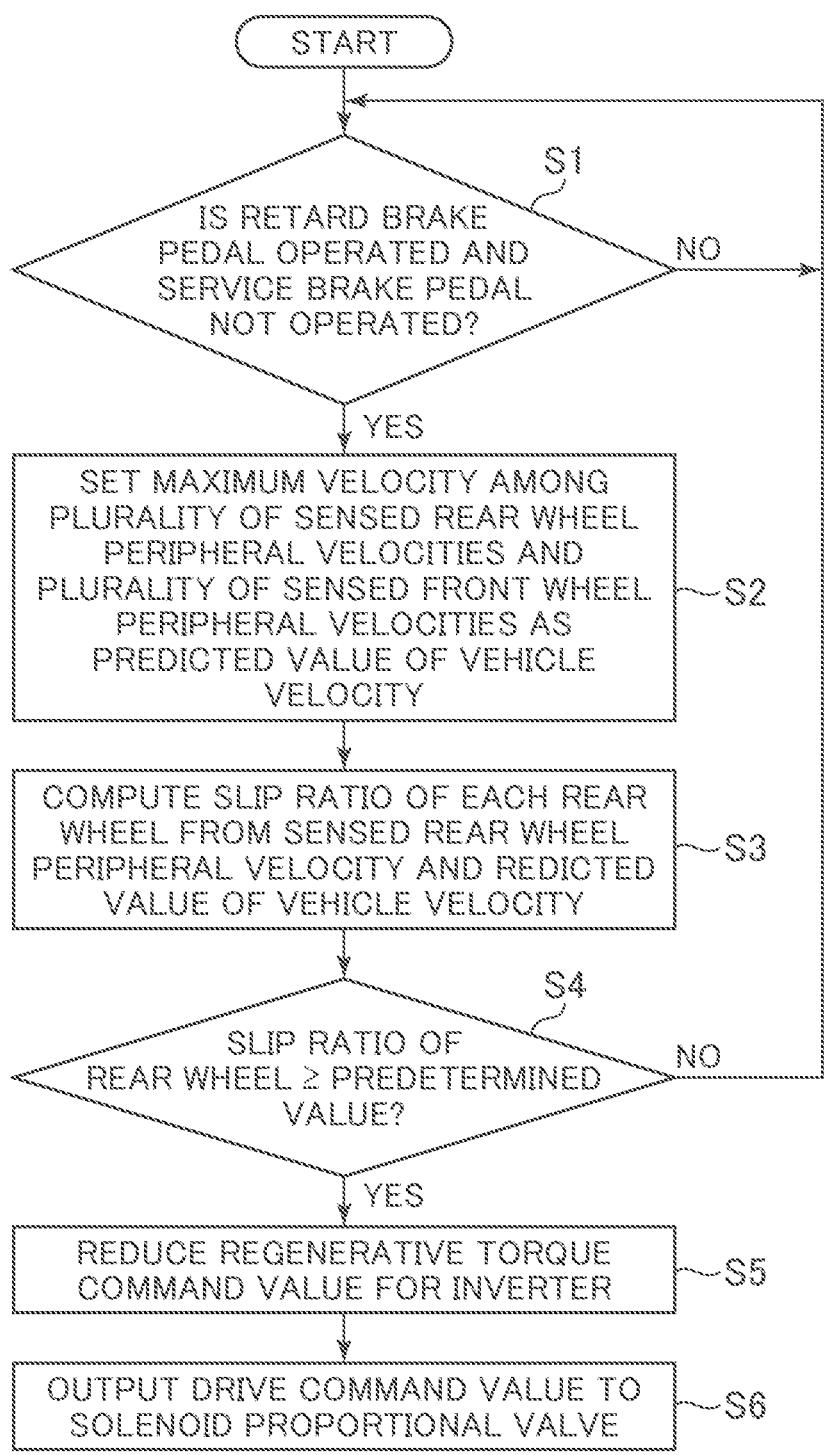
FIG. 3 is a flowchart of a processing sequence of a controller according to the first embodiment of the present invention.

Next, a processing sequence of the controller 13 according to the present embodiment, as well as advantages according to the present embodiment, will be described below. FIG. 3 is a flowchart of the processing sequence of the controller according to the present embodiment.

The controller 13 determines whether or not the retard brake pedal 8 has been operated and the service brake pedal 9 has not been operated on the basis of the operation amount of the retard brake pedal 8 and the operation amount of the service brake pedal 9 that have been sensed by the respective potentiometers thereof (step S1).

The controller 13 sets a maximum velocity among the peripheral velocities sensed by the rear wheel peripheral velocity sensors 20 and the front wheel peripheral velocity sensors 21 as a predicted value V of the vehicle velocity, when the controller 13 determines that the retard brake pedal 8 has been operated and the service brake pedal 9 has not been operated (step S2). Then, the controller 13 computes a slip ratio $\lambda_r$ of each of the rear wheels 6 from the peripheral velocity $v_r$ of each of the rear wheels 6 sensed by each of the rear wheel peripheral velocity sensors 20 and the predicted value V of the vehicle velocity according to the equation (1) shown below (step S3).

[Math. 1]

$$\lambda_r = (V - v_r)V \qquad (1)$$

The controller 13 determines whether or not the slip ratio $\lambda_r$ of each of the rear wheels 6 is equal to or larger than a predetermined value (specifically, for example, a preset value in a range from 0.1 to 0.4) (step S4). Then, when the controller 13 determines that the slip ratio $\lambda_r$ of at least one of the rear wheels 6 is equal to or larger than the predetermined value, i.e., when the controller 13 determines that the rear wheel 6 has slipped, the controller 13 reduces the regenerative torque command value for the inverter 11 (step S5), and outputs a drive command value for generating a braking torque corresponding to the reduction amount of the regenerative torque command value to the solenoid proportional valve 18 (step S6). Details of this processing will be described below.

For example, the controller 13 reduces a predetermined amount from the regenerative torque command value and, after elapse of a predetermined time, determines again whether or not the slip ratio $\lambda_r$ of each of the rear wheels 6 is equal to or larger than the predetermined value. When the controller 13 determines again that the slip ratio $\lambda_r$ of at least one of the rear wheels 6 is equal to or larger than the predetermined value, then the controller 13 further reduces the predetermined amount from the regenerative torque command value and, after elapse of a predetermined time, determines again whether or not the slip ratio $\lambda_r$ of each of the rear wheels 6 is equal to or larger than the predetermined value. This process will be repeated to thereby reduce the braking torques generated for the rear wheels by the electric motors 10, avoiding locking of the rear wheels 6. Note that the controller 13 keeps the regenerative torque command value or gradually increases the regenerative torque command value back to its original value, when the controller 13 determines that the slip ratios $\lambda_r$ of all of the rear wheels 6 are smaller than the predetermined value after elapse of a predetermined time.

Also, the controller 13 outputs a drive command value for generating a braking torque $\Delta T$ corresponding to the reduction amount of the regenerative torque command value to the solenoid proportional valve 18. The solenoid proportional valve 18 generates a hydraulic pressure P corresponding to the drive command value from the controller 13. Here, since the retard brake pedal 8 has been operated and the service brake pedal 9 has not been operated, as described above, the hydraulic pressure is generated by the solenoid proportional valve 18, whereas no hydraulic pressure is generated by the hydraulic valve 15. Therefore, the plurality of front brakes 17 are actuated by the hydraulic pressure from the solenoid proportional valve 18 that has been selected by the higher-pressure selecting valve 19. Accordingly, the state where only the braking torques generated for the rear wheels by the electric motors 10 are acquired before the rear wheels 6 slip transitions to the state where the braking torques generated for the rear wheels by the electric motors 10 and the braking torques generated for the front wheels by the front wheel brakes 17 are acquired after the rear wheels 6 have slipped.

Consequently, while locking of the rear wheels 6 is being avoided, an overall braking torque for the vehicle corresponding to the operation amount of the retard brake pedal 8 (stated otherwise, according to the intention of the driver) can be ensured. Particularly, inasmuch as the braking forces generated for the rear wheels by the rear wheel brakes 16 are not acquired unlike the situation where the driver operates the retard brake pedal 8 and in addition operates the service brake pedal 9, locking of the rear wheels 6 is avoided. Moreover, the rear wheels 16 can be used less frequently with their deterioration restrained.

Note that the braking torque $\Delta T$ corresponding to the reduction amount of the regenerative torque command value is represented by the equation (2) shown below, the braking torque, indicated by $T_b$, for each of the front wheel brakes 17, is represented by the equation (3) shown below, and the hydraulic pressure P from the solenoid proportional valve 18 is represented by the equation (4) shown below. In these equations, n indicates the number of the front wheel brakes, P the coefficient of friction of the shoes, P the working hydraulic pressure of the hydraulic cylinder, r the radius of the piston of the hydraulic cylinder, R the effective radius of the portion of each of the shoes pressed against the respective disks, and N the number of the shoes.

[Math. 2]
$$\Delta T = n \times T_b \quad (2)$$

[Math. 3]
$$T_b = \mu \times P \times \pi \times r^2 \times R \times N \quad (3)$$

[Math. 4]
$$P = T_b / (\mu \times \pi \times r^2 \times R \times N) \quad (4)$$

Second Embodiment

Figure 4:
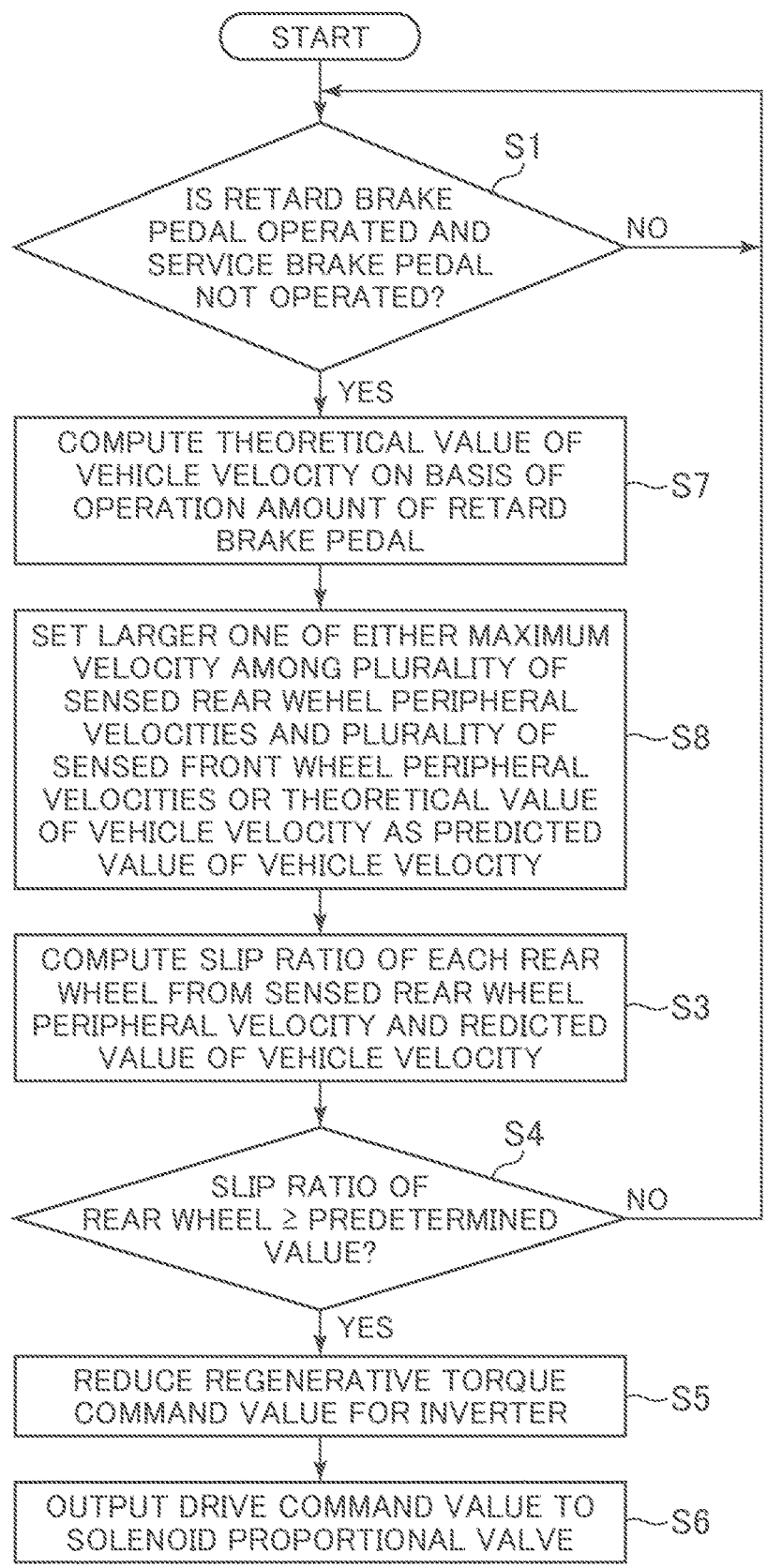
FIG. 4 is a flowchart of a processing sequence of a controller according to a second embodiment of the present invention.

A second embodiment of the present invention will be described below with reference to FIG. 4. FIG. 4 is a flowchart of a processing sequence of a controller according to the present embodiment. Note that those parts that are equivalent to those according to the first embodiment will be omitted from description.

The controller 13 determines whether or not the retard brake pedal 8 has been operated and the service brake pedal 9 has not been operated on the basis of the operation amount of the retard brake pedal 8 and the operation amount of the service brake pedal 9 that have been sensed by the respective potentiometers thereof (step S1).

The controller 13 computes a theoretical value $V_i$ of the vehicle velocity when a braking torque T corresponding to the operation amount of the retard brake pedal 8 is generated, on the basis of the operation amount of the retard brake pedal 8, when the controller 13 determines that the retard brake pedal 8 has been operated and the service brake pedal 9 has not been operated (step S7).

The theoretical value $V_i$ will be described in specific detail below. As indicated by the equation (5) shown below, a deceleration a of the vehicle has the braking torque T as a parameter, and as indicated by the equation (6) shown below, the theoretical value $V_i$ of the vehicle velocity has the time integral value of the deceleration a as a parameter. Note that, in these equations, M indicates the total weight of the vehicle that is represented by a setting value (average value) according to the present embodiment.

[Math. 5]
$$\alpha = -T/(M \times R_r) \quad (5)$$

[Math. 6]
$$V_i = V_0 - \int_{t_0}^{t} T(\tau) d\tau /(M \times R_r) \quad (6)$$

When the operation amount of the retard brake pedal 8 is zero (time $t_0$), the braking torque is T=0, and the vehicle velocity $V_0$ is the same as the peripheral velocities sensed by the rear wheel peripheral velocity sensors 20 or the front wheel peripheral velocity sensors 21. The controller 13 stores, in advance, the peripheral velocities sensed by the rear wheel peripheral velocity sensors 20 or the front wheel peripheral velocity sensors 21 as the vehicle velocity $V_0$ at time $t_0$. Then, as indicated by the equation (6) above, the controller 13 computes the theoretical value $V_i$ of the vehicle velocity by subtracting the time integral value of the deceleration a from the vehicle velocity $V_0$.

The controller 13 sets a larger one of a maximum velocity among the peripheral velocities sensed by the plurality of rear wheel peripheral velocity sensors 20 and the plurality of front wheel peripheral velocity sensors 21 and the theoretical value $V_i$ of the vehicle velocity described above as a predicted value V of the vehicle velocity (step S8). The subsequence processing stages (steps S3 through S6) are the same as those according to the first embodiment, and will be omitted from description.

Also according to the present embodiment, as with the first embodiment, while locking of the rear wheels 6 is being avoided, an overall braking torque for the vehicle corresponding to the operation amount of the retard brake pedal 8 can be ensured. According to the present embodiment, moreover, the accuracy of the predicted value V of the vehicle velocity can be increased for a higher level of accuracy with which to determine a slip of the rear wheels 6, compared with the first embodiment.

Third Embodiment

Figure 5:
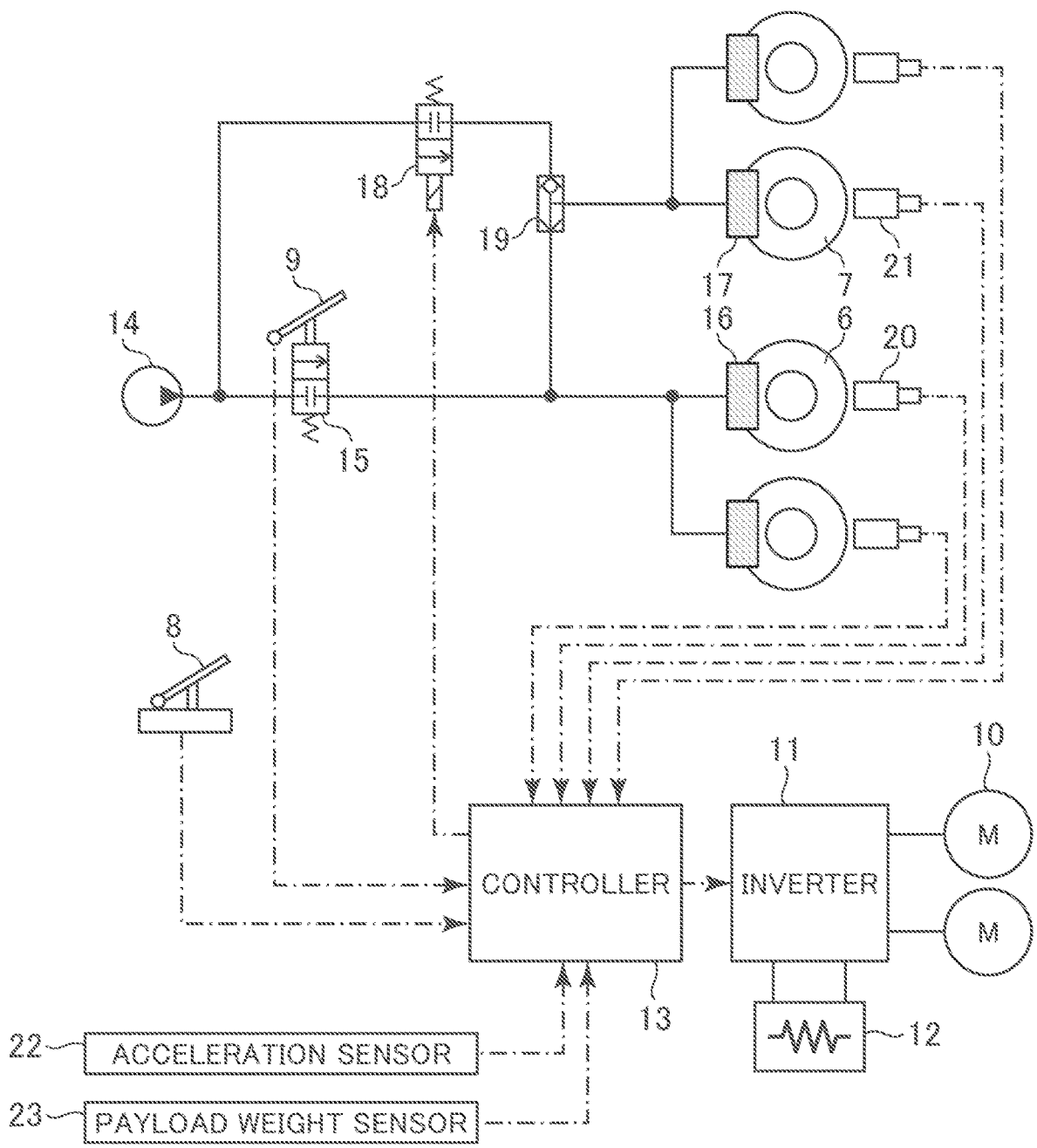
FIG. 5 is a diagram illustrating a configuration of a drive system of a dump truck according to a third embodiment of the present invention.

A third embodiment of the present invention will be described below with reference to FIG. 5. FIG. 5 is a diagram illustrating the configuration of a drive system of a dump truck according to the present embodiment. Note that those parts according to the present embodiment that are equivalent to those according to the first and second embodiments will be omitted from description.

The drive system of the dump truck according to the present embodiment further includes an acceleration sensor 22 for sensing a vehicle acceleration (specifically, a deceleration a) and a payload weight sensor 23 for sensing a vehicle payload weight (specifically, the weight of a load).

The controller 13 according to the present embodiment stores a dynamic model for computing a theoretical value $V_i$ of the vehicle velocity, using, as parameters, the braking torque T corresponding to the operation amount of the retard brake pedal 8, the deceleration a sensed by the acceleration sensor 22, the total vehicle weight M computed on the basis of a sensed value from the payload weight sensor 23, and the peripheral velocities sensed by the front wheel peripheral velocity sensors 21. Moreover, the controller 13 corrects the dynamic model such that, when the braking torque is T=0, the theoretical value $V_i$ of the vehicle velocity that is computed using the dynamic model becomes the same as the peripheral velocities sensed by the rear wheel peripheral velocity sensors 20 or the front wheel peripheral velocity sensors 21.

Using the dynamic model described above, the controller 13 computes a theoretical value $V_t$ of the vehicle velocity on the basis of the operation amount of the retard brake pedal 8 and sensed results from the acceleration sensor 22, the payload weight sensor 23, and the front wheel peripheral velocity sensors 21 (step S7 in FIG. 4 described above). The other processing stages (steps S1, S8, and S3 through S6 in FIG. 4 described above) are the same as those according to the second embodiment, and will be omitted from description.

Also, according to the present embodiment, as with the first and second embodiments, while locking of the rear wheels 6 is being avoided, an overall braking torque for the vehicle corresponding to the operation amount of the retard brake pedal 8 can be ensured. As with the second embodiment, moreover, the accuracy of the predicted value V of the vehicle velocity is increased for a higher level of accuracy with which to determine a slip of the rear wheels 6.

Figure 6:
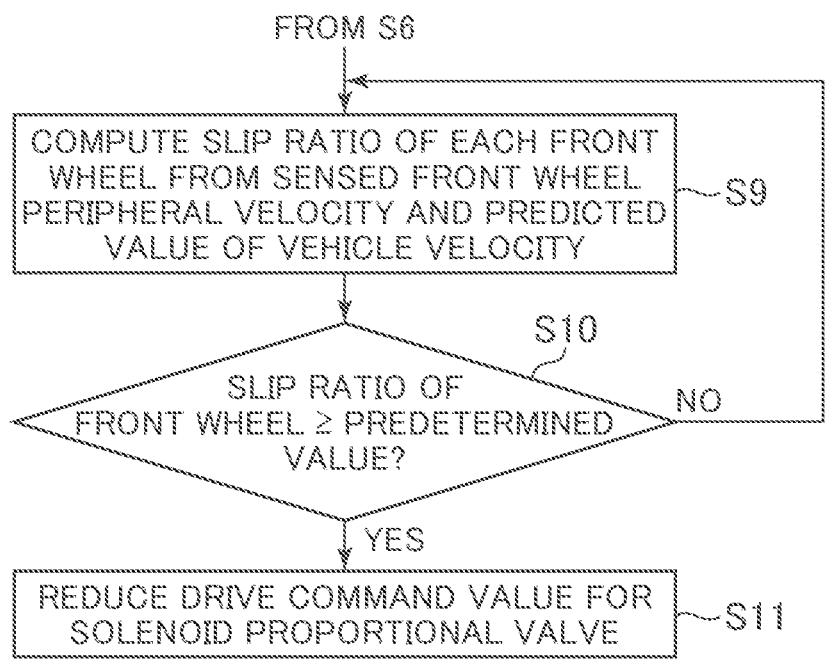
FIG. 6 is a flowchart of a processing sequence of a controller according to a first modification of the present invention.

Although not described in particular, in the first through third embodiments, the controller 13 may determine a slip of the front wheels 7 after it has output a drive command value to the solenoid proportional valve 18 (after step S6). Such a first modification will be described below with reference to FIG. 6. FIG. 6 is a flowchart of a processing sequence of a controller according to the present modification.

The controller 13 according to the present modification computes a slip ratio $\lambda_f$ of each of the front wheels 7 from the peripheral velocity $\lambda_f$ of each of the front wheels 7 sensed by each of the front wheel peripheral velocity sensors 21 and the predicted value V of the vehicle velocity according to the equation (7) shown below (step S9).

[Math. 7]

$$\lambda_f = (V - v_f)/V \qquad (7)$$

The controller 13 determines whether or not the slip ratio $\lambda_f$ of each of the front wheels 7 is equal to or larger than a predetermined value (specifically, for example, a preset value in a range from 0.1 to 0.4) (step S10). When the controller 13 determines that the slip ratio $\lambda_f$ of at least one of the front wheels 7 is equal to or larger than the predetermined value, i.e., when the controller 13 determines that the front wheel 7 has slipped, then the controller 13 reduces the drive command value for the solenoid proportional valve 18 (step S11). Thus, the braking torques generated for the front wheels by the front wheel brakes 17 are reduced to avoid locking of the front wheels 7.

Figure 7:
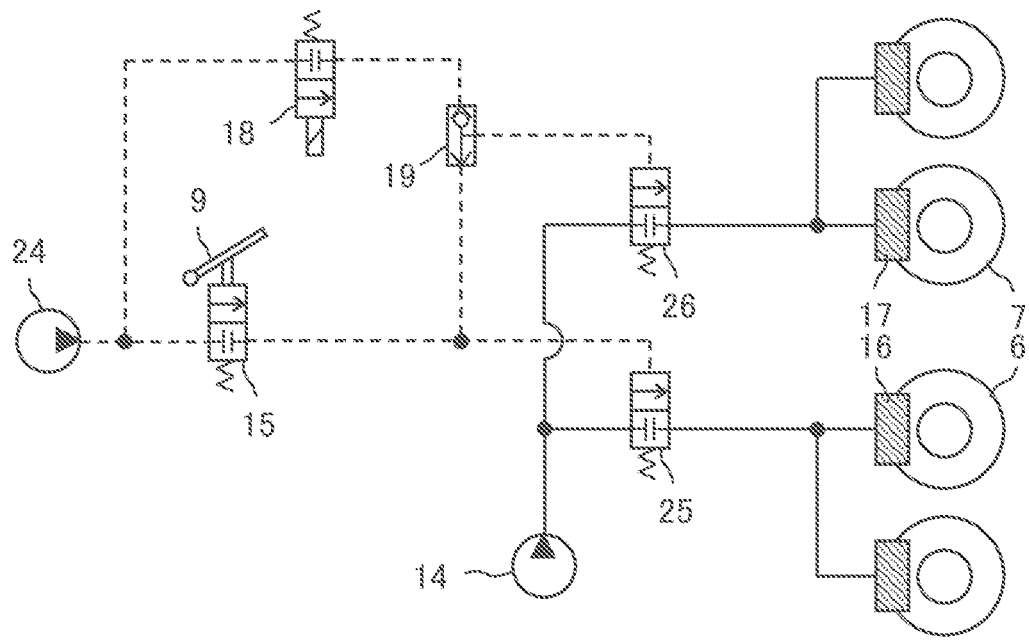
FIG. 7 is a diagram illustrating a portion of a configuration of a drive system of a dump truck according to a second modification of the present invention.

Also, in the first through third embodiments, the dump truck has been described by way of example as including the plurality of rear wheel brakes 16 actuated by the hydraulic pressure (working hydraulic pressure) from the hydraulic valve 15 and the plurality of front wheel brakes 17 actuated by the hydraulic pressure (working hydraulic pressure) selected by the higher-pressure selecting valve 19. However, the present invention is not limited to such details. Specifically, the dump truck may be configured such that the plurality of front wheel brakes 17 are actuated according to the hydraulic pressure selected by the higher-pressure selecting valve 19. For example, according to a second modification illustrated in FIG. 7, the dump truck may include the hydraulic valve 15 that generates a hydraulic pressure (pilot pressure) corresponding to the operation amount of the service brake pedal 9 with the hydraulic pressure discharged from a pilot pump 24 as a source pressure, a first hydraulic control valve 25 that generates a working hydraulic pressure with the hydraulic pressure discharged from the hydraulic pump 14 as a source pressure, the rear wheel brakes 16 actuated by the working hydraulic pressure from the first hydraulic control valve 25, the solenoid proportional valve 18 that generates a hydraulic pressure (pilot pressure) corresponding to the drive command value from the controller 13 with the hydraulic pressure discharged from the pilot pump 24 as a source pressure, the higher-pressure selecting valve 19 that selects a higher one of the hydraulic pressure from the hydraulic valve 15 and the hydraulic pressure from the solenoid proportional valve 18, a second hydraulic control valve 26 that is actuated by the hydraulic pressure selected by the higher-pressure selecting valve 19 to generate a working hydraulic pressure with the hydraulic pressure discharged from the hydraulic pump 14 as a source pressure, and the front wheel brakes 17 actuated by the working hydraulic pressure from the second hydraulic control valve. The dump truck thus configured allows the rear wheel brakes 16 and the front wheel brakes 17 to be larger in size.

Figure 8:
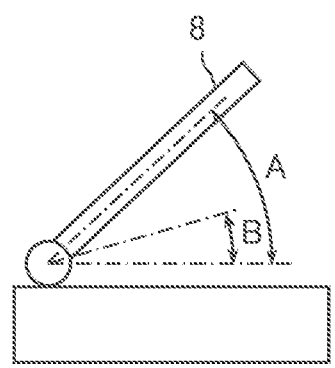
FIG. 8 is a view illustrating an operable range of a retard brake pedal according to a third modification of the present invention.

In the first through third embodiments, moreover, the dump truck has been described by way of example as regeneratively controlling the electric motors 10 according to an operation of the retard brake pedal 8. However, the present invention is not limited to such details. For example, according to a third modification illustrated in FIG. 8, the dump truck may be configured such that the electric motors 10 are regeneratively controlled when the retard brake pedal 8 is operated in a range A, and the plurality of rear wheel brakes 16 and the plurality of front wheel brakes 17 are actuated when the retard brake pedal 8 is operated in a range B (stated otherwise, when the operation amount of the retard brake petal 8 exceeds a threshold value).

According to the present modification, in a full range of the operation amount of the retard brake pedal 8, the controller 13 outputs a regenerative torque command value for generating a braking torque corresponding to the operation amount of the retard brake pedal 8 to the inverter 11, which regeneratively controls the electric motors 10. The hydraulic valve 15 or another hydraulic valve (not shown) is actuated in response to the operation of the retard brake pedal 8, when the operation amount of the retard brake pedal 8 exceeds the threshold value. Thus, a hydraulic pressure corresponding to (specifically, proportional, for example) to the operation amount of the retard brake pedal 8 is generated, with the hydraulic pressure discharged from the hydraulic pump 14 as a source pressure. The hydraulic pressure generated by the hydraulic valve 15 or other hydraulic valve is delivered to the plurality of rear wheel brakes 16 and the higher-pressure selecting valve 19 as with the first embodiment, or to the first hydraulic control valve 25 and the higher-pressure selecting valve 19 as with the second modification. The present modification makes it possible to achieve higher safety.

DESCRIPTION OF REFERENCE CHARACTERS

6: Rear wheel (drive wheel)
7: Front wheel (driven wheel)
8: Retard brake pedal (first brake pedal)
9: Service brake pedal (second brake pedal)
10: Electric motor
11: Inverter
13: Controller
15: Hydraulic valve
16: Rear wheel brake (drive wheel brake)
17: Front wheel brake (driven wheel brake)

18: Solenoid proportional valve
19: Higher-pressure selecting valve
20: Rear wheel peripheral velocity sensor (drive wheel peripheral velocity sensor)
21: Front wheel peripheral velocity sensor (driven wheel peripheral velocity sensor)
22: Acceleration sensor
23: Payload weight sensor
25: First hydraulic control valve
26: Second hydraulic control valve

The invention claimed is:

1. A dump truck comprising:
a plurality of drive wheels;
a plurality of driven wheels;
an electric motor for driving the plurality of drive wheels;
an inverter for controlling the electric motor;
a first brake pedal operable by a driver;
a controller configured to output a regenerative torque command value for generating a braking torque corresponding to an operation amount of the first brake pedal to the inverter and to cause the inverter to regeneratively control the electric motor;
a second brake pedal operable by the driver;
a hydraulic valve for generating a hydraulic pressure corresponding to an operation amount of the second brake pedal;
a plurality of drive wheel brakes combined with the plurality of respective drive wheels and actuated according to the hydraulic pressure generated by the hydraulic valve; and
a plurality of driven wheel brakes combined with the plurality of respective driven wheels and actuated according to the hydraulic pressure generated by the hydraulic valve,
wherein the dump truck further includes
a plurality of drive wheel peripheral velocity sensors that sense respective peripheral velocities of the plurality of drive wheels,
a plurality of driven wheel peripheral velocity sensors that sense respective peripheral velocities of the plurality of driven wheels,
a solenoid proportional valve for generating a hydraulic pressure, and
a higher-pressure selecting valve for selecting and delivering a higher one of the hydraulic pressure from the hydraulic valve and the hydraulic pressure from the solenoid proportional valve,
the controller is configured to, when the first brake pedal is operated and the second brake pedal is not operated, compute a theoretical value of a vehicle velocity when a braking torque corresponding to the operation amount of the first brake pedal is generated, set a larger one of a maximum velocity among the peripheral velocities sensed by the plurality of drive wheel peripheral velocity sensors and the plurality of driven wheel peripheral velocity sensors and the theoretical value of the vehicle velocity as a predicted value of the vehicle velocity, compute slip ratios of the plurality of the drive wheels from the peripheral velocities of the plurality of drive wheels sensed by the plurality of drive wheel peripheral velocity sensors and the predicted value of the vehicle velocity, and determine whether or not the slip ratios of the plurality of drive wheels are equal to or larger than a predetermined value,
the controller is configured to reduce the regenerative torque command value and output a drive command value for generating a braking torque corresponding to the reduction amount of the regenerative torque command value to the solenoid proportional valve, when determining that a slip ratio of at least one of the drive wheels is equal to or larger than the predetermined value,
the solenoid proportional valve generates a hydraulic pressure corresponding to the drive command value, and
the plurality of driven wheel brakes are actuated according to the hydraulic pressure selected by the higher-pressure selecting valve.

2. The dump truck according to claim 1, further comprising:
an acceleration sensor that senses a vehicle acceleration; and
a payload weight sensor that senses a vehicle payload weight,
wherein the controller is configured to compute the theoretical value of the vehicle velocity on a basis of the operation amount of the first brake pedal and sensed results from the acceleration sensor, the payload weight sensor, and the driven wheel peripheral velocity sensors.

3. The dump truck according to claim 1, wherein the controller is configured to
determine whether or not slip ratios of the plurality of driven wheels are equal to or larger than a predetermined value on a basis of sensed results from the plurality of driven wheel peripheral velocity sensors after having output the drive command value to the solenoid proportional valve, and
reduce the drive command value, when determining that a slip ratio of at least one of the driven wheels is equal to or larger than the predetermined value.

4. The dump truck according to claim 1, wherein
the controller is configured to output a regenerative torque command value for generating a braking torque corresponding to the operation amount of the first brake pedal to the inverter and to cause the inverter to regeneratively control the electric motor, and
when the operation amount of the first brake pedal exceeds a threshold value, the hydraulic valve or another hydraulic valve generates a hydraulic pressure corresponding to the operation amount of the first brake pedal.

5. A dump truck comprising:
a plurality of drive wheels;
a plurality of driven wheels;
an electric motor for driving the plurality of drive wheels;
an inverter for controlling the electric motor;
a first brake pedal operable by a driver;
a controller configured to output a regenerative torque command value for generating a braking torque corresponding to an operation amount of the first brake pedal to the inverter and to cause the inverter to regeneratively control the electric motor;
a second brake pedal operable by the driver;
a hydraulic valve for generating a hydraulic pressure corresponding to an operation amount of the second brake pedal;
a plurality of drive wheel brakes combined with the plurality of respective drive wheels and actuated according to the hydraulic pressure generated by the hydraulic valve; and a plurality of driven wheel brakes combined with the plurality of respective driven wheels and actuated according to the hydraulic pressure generated by the hydraulic valve, wherein the dump truck further includes
- a plurality of drive wheel peripheral velocity sensors that sense respective peripheral velocities of the plurality of drive wheels,
- a solenoid proportional valve for generating a hydraulic pressure, and
- a higher-pressure selecting valve for selecting and delivering a higher one of the hydraulic pressure from the hydraulic valve and the hydraulic pressure from the solenoid proportional valve, the controller is configured to determine whether or not slip ratios of the plurality of drive wheels are equal to or larger than a predetermined value on a basis of sensed results from the plurality of drive wheel peripheral velocity sensors, when the first brake pedal is operated and the second brake pedal is not operated, the controller is configured to reduce the regenerative torque command value and output a drive command value for generating a braking torque corresponding to the reduction amount of the regenerative torque command value to the solenoid proportional valve, when determining that a slip ratio of at least one of the drive wheels is equal to or larger than the predetermined value, the solenoid proportional valve generates a hydraulic pressure corresponding to the drive command value, the plurality of drive wheel brakes are actuated by the hydraulic pressure from the hydraulic valve, and the plurality of driven wheel brakes are actuated by the hydraulic pressure selected by the higher-pressure selecting valve.

6. The dump truck according to claim 5, further comprising:
a plurality of driven wheel peripheral velocity sensors that sense respective peripheral velocities of the plurality of driven wheels,
wherein the controller is configured to set a maximum velocity among the peripheral velocities sensed by the plurality of drive wheel peripheral velocity sensors and the plurality of driven wheel peripheral velocity sensors as a predicted value of a vehicle velocity, and to compute slip ratios of the drive wheels from the peripheral velocities of the drive wheels sensed by the drive wheel peripheral velocity sensors and the predicted value of the vehicle velocity.

7. The dump truck according to claim 5, further comprising:
a plurality of driven wheel peripheral velocity sensors that sense respective peripheral velocities of the plurality of driven wheels,
wherein the controller is configured to
determine whether or not slip ratios of the plurality of driven wheels are equal to or larger than a predetermined value on a basis of sensed results from the plurality of driven wheel peripheral velocity sensors after having output the drive command value to the solenoid proportional valve, and
reduce the drive command value, when determining that a slip ratio of at least one of the driven wheels is equal to or larger than the predetermined value.

8. The dump truck according to claim 5, wherein
the controller is configured to output a regenerative torque command value for generating a braking torque corresponding to the operation amount of the first brake pedal to the inverter and to cause the inverter to regeneratively control the electric motor, and when the operation amount of the first brake pedal exceeds a threshold value, the hydraulic valve or another hydraulic valve generates a hydraulic pressure corresponding to the operation amount of the first brake pedal.

9. A dump truck comprising:
a plurality of drive wheels;
a plurality of driven wheels;
an electric motor for driving the plurality of drive wheels;
an inverter for controlling the electric motor;
a first brake pedal operable by a driver;
a controller configured to output a regenerative torque command value for generating a braking torque corresponding to an operation amount of the first brake pedal to the inverter and to cause the inverter to regeneratively control the electric motor;
a second brake pedal operable by the driver;
a hydraulic valve for generating a hydraulic pressure corresponding to an operation amount of the second brake pedal;
a plurality of drive wheel brakes combined with the plurality of respective drive wheels and actuated according to the hydraulic pressure generated by the hydraulic valve; and
a plurality of driven wheel brakes combined with the plurality of respective driven wheels and actuated according to the hydraulic pressure generated by the hydraulic valve,
wherein the dump truck further includes
a plurality of drive wheel peripheral velocity sensors that sense respective peripheral velocities of the plurality of drive wheels,
a solenoid proportional valve for generating a hydraulic pressure, and
a higher-pressure selecting valve for selecting and delivering a higher one of the hydraulic pressure from the hydraulic valve and the hydraulic pressure from the solenoid proportional valve,
a first hydraulic control valve actuated by the hydraulic pressure from the hydraulic valve, the first hydraulic control valve generating a working hydraulic pressure; and
a second hydraulic control valve actuated by the hydraulic pressure selected by the higher-pressure selecting valve, the second hydraulic control valve generating a working hydraulic pressure,
the controller is configured to determine whether or not slip ratios of the plurality of drive wheels are equal to or larger than a predetermined value on a basis of sensed results from the plurality of drive wheel peripheral velocity sensors, when the first brake pedal is operated and the second brake pedal is not operated,
the controller is configured to reduce the regenerative torque command value and output a drive command value for generating a braking torque corresponding to the reduction amount of the regenerative torque command value to the solenoid proportional valve, when determining that a slip ratio of at least one of the drive wheels is equal to or larger than the predetermined value,
the solenoid proportional valve generates a hydraulic pressure corresponding to the drive command value, the plurality of drive wheel brakes are actuated by the working hydraulic pressure from the first hydraulic control valve, and the plurality of driven wheel brakes are actuated by the working hydraulic pressure from the second hydraulic control valve.

10. The dump truck according to claim 9, further comprising:

a plurality of driven wheel peripheral velocity sensors that sense respective peripheral velocities of the plurality of driven wheels, wherein the controller is configured to set a maximum velocity among the peripheral velocities sensed by the plurality of drive wheel peripheral velocity sensors and the plurality of driven wheel peripheral velocity sensors as a predicted value of a vehicle velocity, and to compute slip ratios of the drive wheels from the peripheral velocities of the drive wheels sensed by the drive wheel peripheral velocity sensors and the predicted value of the vehicle velocity.

11. The dump truck according to claim 9, further comprising:

a plurality of driven wheel peripheral velocity sensors that sense respective peripheral velocities of the plurality of driven wheels, wherein the controller is configured to determine whether or not slip ratios of the plurality of driven wheels are equal to or larger than a predetermined value on a basis of sensed results from the plurality of driven wheel peripheral velocity sensors after having output the drive command value to the solenoid proportional valve, and reduce the drive command value, when determining that a slip ratio of at least one of the driven wheels is equal to or larger than the predetermined value.

12. The dump truck according to claim 9, wherein the controller is configured to output a regenerative torque command value for generating a braking torque corresponding to the operation amount of the first brake pedal to the inverter and to cause the inverter to regeneratively control the electric motor, and when the operation amount of the first brake pedal exceeds a threshold value, the hydraulic valve or another hydraulic valve generates a hydraulic pressure corresponding to the operation amount of the first brake pedal.

* * * * *